United States Patent [19]

Lueders et al.

[11] 4,189,461

[45] * Feb. 19, 1980

[54] METAL LEACHING FROM CONCENTRATES USING NITROGEN DIOXIDE IN ACIDS

[75] Inventors: Robert E. Lueders, Needham, Mass.; Theodore C. Frankiewicz, Westminster, Calif.

[73] Assignee: Kennecott Copper Corporation, New York, N.Y.

[*] Notice: The portion of the term of this patent subsequent to Jan. 2, 1996, has been disclaimed.

[21] Appl. No.: 880,552

[22] Filed: Feb. 23, 1978

Related U.S. Application Data

[63] Continuation-in-part of Ser. No. 855,983, Nov. 30, 1977, Pat. No. 4,132,758.

[51] Int. Cl.$^2$ .................... C01G 3/10; C01G 9/06; C01G 51/10; C01G 53/10
[52] U.S. Cl. .................................. 423/27; 423/53; 423/109; 423/41; 423/150
[58] Field of Search .................. 75/101 R, 115, 117; 423/41, 27, 150, 109, 53

[56] References Cited

U.S. PATENT DOCUMENTS

| | | | |
|---|---|---|---|
| 287,737 | 10/1883 | Stetefeldt | 75/101 R |
| 653,414 | 7/1900 | Fink | 75/101 R |
| 1,150,787 | 8/1915 | Rankin | 75/101 R |
| 2,871,116 | 1/1959 | Clark | 75/115 |
| 3,888,748 | 6/1975 | Brenneke | 423/109 |

OTHER PUBLICATIONS

Boldt, *The Winning of Nickel*, Longmans Canada Ltd., Toronto, 1967, pp. 294, 295.

*Primary Examiner*—Herbert T. Carter
*Attorney, Agent, or Firm*—John L. Sniado; Anthony M. Lorusso

[57] ABSTRACT

Sulfidic minerals containing metal values such as copper, silver, nickel, cobalt, molybdenum, zinc, iron, or mixtures thereof are leached in two stages. In the second stage, preleached minerals are oxidized with nitrogen dioxide to enable the metal values to be solubilized in the aqueous acidic leach liquor in that stage. During the reaction, the nitrogen dioxide is reduced to nitric oxide. The nitric oxide is oxidized to nitrogen dioxide by oxygen. The acidic metal bearing liquor from the second stage flows to a first stage where it preleaches fresh minerals. The metal bearing liquor is delivered from the first stage to metal recovery while preleached minerals are delivered to the second stage.

10 Claims, 2 Drawing Figures

METAL LEACHING FROM CONCENTRATES USING NITROGEN DIOXIDE IN ACIDS

CROSS REFERENCE TO A RELATED APPLICATION

This application is a continuation-in-part of pending U.S. application Ser. No. 855,983 filed Nov. 30, 1977, now U.S. Pat. No. 4,132,758 entitled Copper Leaching Process Employing Nitrogen Dioxide.

BACKGROUND OF THE INVENTION

This invention relates to a hydrometallurgical process for recovering metal values from sulfidic minerals and more particularly to a leaching process wherein a nitrogen dioxide containing gas is passed through an acidic leaching liquor to oxidize the minerals in the leach liquor.

As a preliminary step to winning copper, silver, nickel, cobalt, molybdenum, iron, and/or zinc metal from sulfidic minerals, it is necessary to oxidize the minerals to enable the aqueous solution to solubilize these metal values. The oxidation reactions may be effected by high temperatures roasts or by hydrometallurgical processes involving the use of an aqueous acidic leach liquor containing an oxidant such as nitric acid. The former procedure has the advantages of being relatively non-selective in terms of mineral reactivities and of consuming significantly less energy during the oxidation process as compared with hydrometallurgical techniques. Unfortunately, conventional roast reactors produce large volumes of dilute sulfur dioxide gas which necessitates the use of expensive ancillary equipment for removing sulfur dioxide from the effluents so that environmental protection standards can be met. The hydrometallurgical processes, on the other hand, typically involve relatively expensive reagents such as nitric acid which, from a practical point of view, must be regenerated and recycled. The cost of the equipment needed to regenerate nitric acid in a conventional nitric acid leach liquor represents a significant capital investment. Accordingly, the use of nitric acid for leaching metal values from sulfidic minerals has not had wide commercial success.

In prior application Ser. No. 855,983 entitled "Copper Leaching Process Employing Nitrogen Dioxide," the teachings of which are incorporated herein by reference, a process is disclosed which utilizes nitrogen dioxide to oxidize sulfidic ores to enable metal values to be leached in an aqueous leach liquor. This process has many advantages which include low volumes of off-gases produced, rapid adaptation to changes in mineralogy and grade of the concentrate feed, and the ability to attack even the most refractory minerals. In the process of that application, a particulate sulfidic mineral is added to an aqueous acidic leach liquor and a nitrogen dioxide containing gas is sparged through the resulting slurry. In this single stage leach, the sulfidic minerals are oxidized and the metal values are dissolved. Although this process has many advantages, it does not offer the stoichiometric control that results from the present invention.

SUMMARY OF THE INVENTION

In accordance with the present invention, the particulated sulfidic mineral is added to a first stage containing an aqueous nitric acidic leach liquor where it is preleached. The preleached mineral is then delivered to a second leach tank containing an aqueous acidic leach liquor where it is contacted with nitrogen dioxide. In this second leach tank, metal leaching is approximately 99% completed. The resulting metal bearing liquor from the second leach tank containing unreacted nitric acid is then delivered to the first leach tank where it contacts fresh minerals. The metal bearing liquor exiting the first leach tank is then delivered to a metal recovery system.

DESCRIPTION OF THE PREFERRED EMBODIMENTS

Figure 1:
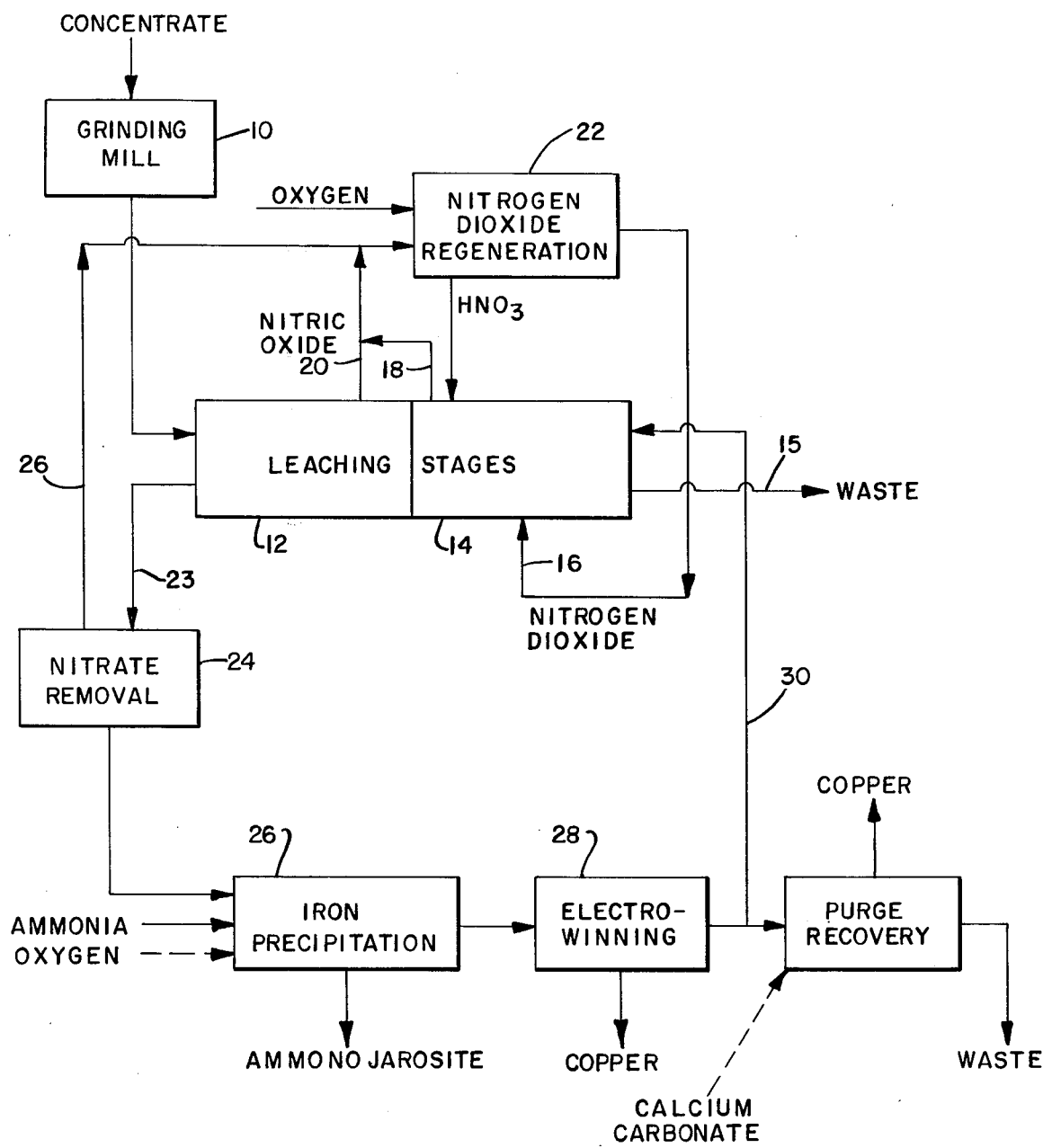
FIG. 1 is a systematic diagram illustrating an overall metal recovery scheme in accordance with the present invention; and, FIG. 2 is a diagram showing the two stage leaching of FIG. 1 in greater detail.

The invention provides a process for oxidizing particulate ores or concentrates thereof containing copper, silver, nickel, cobalt, molybdenum, and/or zinc values associated with sulfide and/or sulfide and iron to enable an aqueous acidic leach liquor to solubilize the metal values and produce a solution containing ions such as $Cu^{++}$, $Ag^+$, $Ni^{++}$, $Co^{++}$, $Mo^{++}$, $Fe^{++}$, or $Zn^{++}$. Copper sulfide materials which are treatable by the present process include but are not limited to minerals such as chalcopyrite ($CuFeS_2$), chalcocite ($CuS$), bornite ($CuFeS_4$), covellite ($CuS$), and digenite ($Cu_9S_5$).

The resulting solutions may be treated to recover metal values by any of the well-known techniques such as electrowinning or treatment with suitable organic reductants. The foregoing oxidation is accomplished by leaching the ore or concentrates in two stages. In the second stage, the leaching is performed in the presence of nitrogen dioxide ($NO_2$).

In its broadest overall aspects the present invention is a leaching procedure involving two stages. In the second stage, nitrogen dioxide is sparged into a slurry of partially leached concentrate. The concentrate is delivered from the first stage, where it is preleached, to the second stage. The acidic leach liquor utilized in the second stage is preferably a sulfuric acid containing leach liquor which is delivered from the metal winning circuit. The leach liquor in the second stage may also contain nitric acid which is recovered from off-gas processing. Due to the excellent oxidation of the concentrate by the nitrogen dioxide, about 99% of the metal values available for leaching are leached in the second stage. Following a solid-liquid separation of the reacted slurry, the metal bearing liquor from the second stage is fed to a first stage where it contacts fresh concentrate which is partially leached and which simultaneously depletes nitrate and acid concentrations of the leach liquor to lower levels. Following a solid-liquid separation of the reacted slurry from the first stage, partially leached concentrates are delivered to the second stage and the pregnant liquor is sent to purification and metal winning.

Off-gases from the two stages contain principally NO, unreacted $NO_2$, and water vapor. After cooling and condensing the water and $NO_2$, the NO is compressed and mixed with pure oxygen to form $NO_2$ and recycled to the second reactor. Excess oxygen can also be included in the recycle to the second stage reactor to provide for in situ regeneration of $NO_2$. It is preferred, however, to regenerate the bulk of the NO₂ in a separate off-gas regenerator. However, the NO₂ gas introduced into the second stage leach will almost always contain some amount of oxygen mixed with it.

As is explained above, leaching is conducted in two stages. As is evident to one skilled in the art, three or more stages can be employed. However, at least two stages are desirable.

The stages are arranged for countercurrent flow of solution and wet solids between stages. Each reactor can consist of a horizontal compartmented cylinder with a means for agitation and a cocurrent overflow of solution plus solids from one compartment to the next. Suitable materials for construction of the cylinders include titanium, steel lined with titanium, stainless steel or brick-rubber lined steel. Liquid/solid separation between steps can be accomplished with conventional disc filters with metallic parts in contact with the corrosive solutions made of titanium or any other suitable corrosion-resistant material.

In the process of the invention, it is preferred that the sulfidic minerals be supplied to the leaching tanks in particulate form because the reaction rate depends in part on the surface area available for reaction. Accordingly, those skilled in the art will appreciate that particle size will have an effect on the kinetics of the overall process. Also, as is the case with most leaching procedures, concentrates of the minerals are preferred over raw ores. In one important embodiment of the invention, a sulfide concentrate was particulated to −325 mesh (U.S. Sieve Series) and added to a sufficient amount of leach liquor to produce a slurry containing 15% solids by wt. in the first stage.

As is stated above, the nitrogen dioxide used in the leaching procedure may be pure nitrogen dioxide, but will usually be a nitrogen dioxide containing gas diluted with an oxidizing gas, e.g., air, or, as will be explained more fully below, oxygen. Since the reaction of NO₂ is stoichiometric, it is preferred that a stoichiometric excess of nitrogen dioxide be fed to the leaching tank during the course of the leaching procedure.

It is preferred that the particulate sulfidic mineral or minerals involved and the NO₂ gas be intimately associated. There are various ways to accomplish this result. Thus, nitrogen dioxide may be supplied above the leach liquor and an impeller or the like may be used to agitate the aqueous phase and to entrain the gaseous oxidant. Alternatively, or in addition, the NO₂ may be sparged through the leach liquor using conventional sparging techniques and equipment. Both of these processes and others which may be envisioned are facilitated by the fact that NO₂ is highly soluble in aqueous acidic solutions.

Copper containing sulfidic minerals exemplified by ores comprising CuFeS₂(chalcopyrite) is preferred material for treatment in the process of the invention. When a mineral containing CuFeS₂ and FeS₂ is treated in accordance with the invention, copper and iron ions are produced in accordance with the following overall reaction stoichiometry;

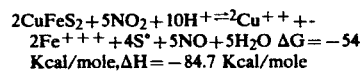

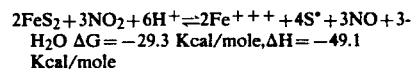

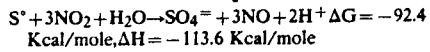

As can be seen from the foregoing equations, nitrogen dioxide is consumed and nitric oxide and sulfate are produced. Hydrogen ions are both consumed and produced. Therefore, the acid balance for the process depends upon how much sulfate is actually produced. The stoichiometry listed above was observed during the leaching of pure CuS and for the leaching of an actual copper sulfide concentrate. The thermodynamic data set forth above were calculated for a temperature of 100° C. and indicate that the reactions occur spontaneously and are exothermic. It should be noted that nitrate is neither a reactant nor a product in the foregoing reactions.

As the above equations also show, as sulfur is produced the NO₂ oxidizes some of it to sulfuric acid. Since sulfuric acid is produced during the reaction, it is preferred to use this mineral acid as the source of hydrogen ions. However, other inorganic acids such as excess nitric acid, hydrochloric acid and phosphoric acid can be employed as a source of hydrogen ions. The consumption of hydrogen ions in the leach will vary with amount of sulfur oxidized to sulfate since this reaction regenerates some of the H⁺ consumed in the sulfide oxidation. In practice, at the conclusion of the leach, some elemental sulfur will remain in the leach liquor together with the gangue.

In view of the foregoing, it can be seen that nitric oxide is produced as a result of the reduction of the nitrogen dioxide. The nitric oxide is reoxidized to regenerate nitrogen dioxide which is then available for further reaction. Such an oxidation is well known in the art and can readily be effected by oxygen in accordance with the equation:

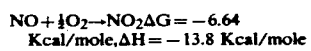

This reaction is exothermic. If oxygen is introduced into the leach liquor together with the nitrogen dioxide, the latter reagent is regenerated spontaneously in-situ. Alternatively, if insufficient quantities of oxygen are introduced together with the nitrogen dioxide in the leach liquor, a nitric oxide rich off-gas may be collected for oxidation in a separate reactor prior to recirculation. In the two stage leach of the present invention, use of the separate off-gas oxidizer is preferred. However, even with a separate NO₂ regenerator, it is desirable to include some O₂ into the second stage reactor in order to regenerate some NO₂ in-situ. The heat of the reaction generated by the off-gas oxidizer may be utilized to generate steam or for preheating additional batches of the leach liquor. With the latter procedure, the temperature in the leaching tank may be more easily maintained at desired levels.

The process of the present invention, which is a two stage leach utilizing nitrogen dioxide as an oxidant in the second stage, is adaptable to conventional two stage sulfuric acid-nitric acid leach procedures. Indeed, the overall equipment utilized is similar to that disclosed in U.S. Pat. No. 3,888,748 entitled "Recovery of Metal Values from Ore Concentrates." The overall equipment required in practicing the present invention is shown schematically in FIG. 1 where a concentrate is ground in a grinding mill 10 and is added to the first stage 12 of a two stage leach system. Sulfuric acid is added to the leaching stages via line 30 which flows from the electrowinning circuit to the second stage 14 of the two stage leach. First stage reactor 12 and second stage reactor 14 are arranged to provide countercurrent flow of liquid and solids between the leach stages. During the leaching, nitrogen dioxide is introduced into the second stage via line 16. An impeller, not shown, may be utilized to suspend the particulate material in the aqueous acidic leach liquor in reactor 14 and to entrain nitrogen dioxide therein. The rate of production of metal ions such as copper and iron depends on the partial pressure of nitrogen dioxide, nitric oxide, and oxygen above the leach liquor, on the temperature of the system, and to some extent on the particle size of the mineral being treated. The nitrogen dioxide reacts with the concentrate in the leaching stages to produce nitric oxide which is collected via lines 18 and 20 and fed to a nitrogen dioxide regeneration plant 22. In the nitrogen dioxide regeneration plant, oxygen is combined with the nitric oxide to produce nitrogen dioxide which is recirculated via line 16 into leach tank 14 in the manner explained above. Further details of the two stage leaching employing nitrogen dioxide in the second stage are set forth below and are shown in FIG. 2.

Figure 2:
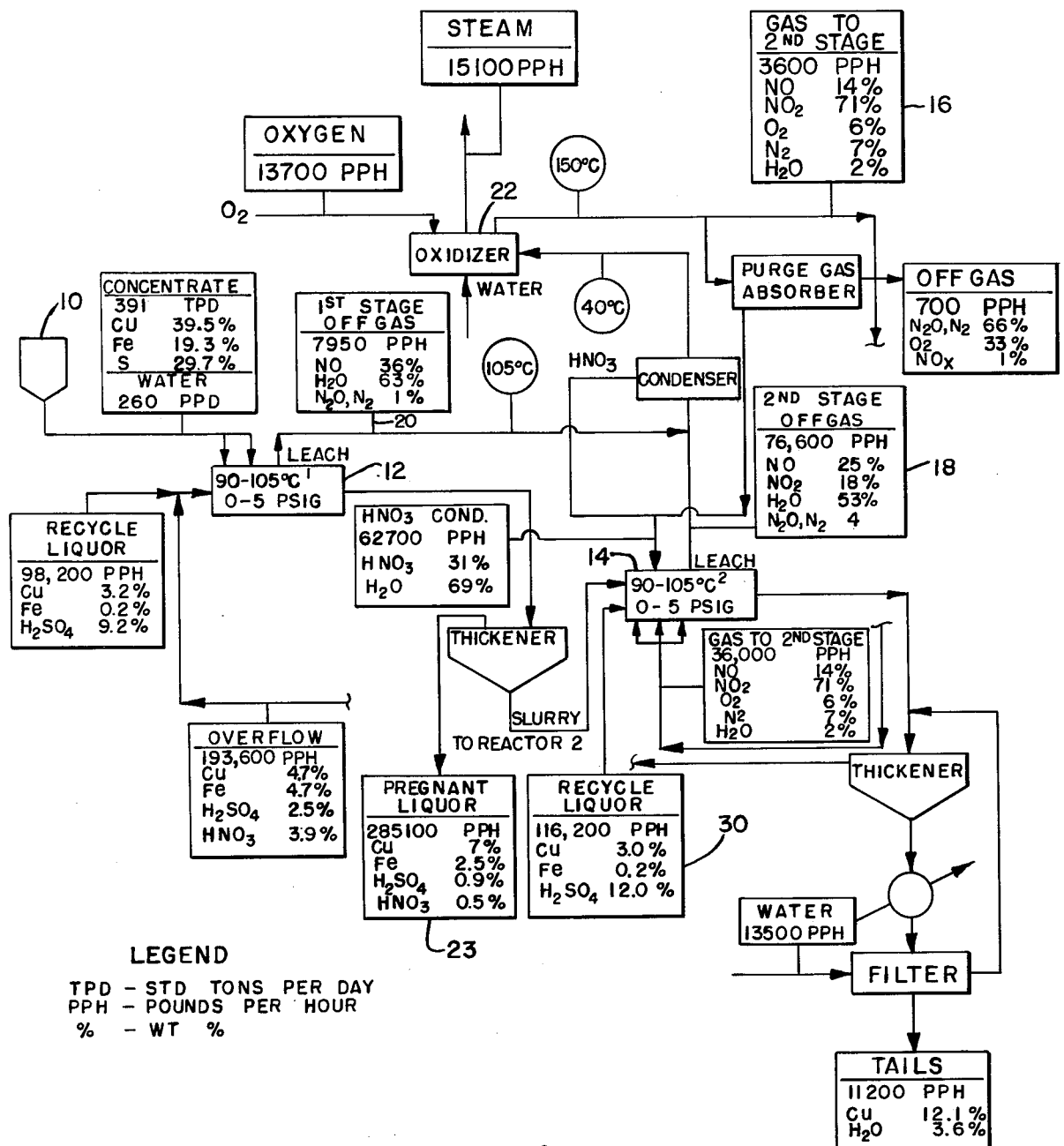

As is shown in FIG. 1, the concentrate which was originally introduced in first stage 12 is removed from second stage 14 via line 15 as waste. The pregnant liquor flows from second stage 14 through first stage 12 and out first stage 12 as is shown by line 23. The pregnant leach solution is then fed to an autoclave 24 where nitrate is removed as nitric oxide which is recycled via line 26 to the nitrogen dioxide regeneration plant 22.

Basically, the nitrate is removed by simple heating. Thus, in autoclave 24, the temperature of the metal bearing leach liquor entering autoclave 24 via line 23 is increased to 140°-200° C. and preferrably 160°-180° C. under pressure for no longer than 45 minutes and usually 3-15 minutes or until the following reaction nears completion.

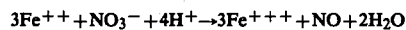

$$3Fe^{++} + NO_3^- + 4H^+ \rightarrow 3Fe^{+++} + NO + 2H_2O$$

The solution in line 23 is heated to the desired temperature in a heat exchanger formed of a corrosion-resistant metal such as titanium with superheated steam as a transfer agent. Nitric oxide off-gas 26 is collected and recycled as is explained above. Iron is precipitated and removed as jarosite at autoclave 26. The pregnant solution is then fed to eletrowinning 28 where copper (or other metals) are recovered. Some residual copper is recycled as a solution of copper sulfate and free sulfuric acid via line 30 for use in second stage 14. Some residual copper is recovered in a purge recovery.

The current efficiency in electrowinning is seriously impaired by concentrations of iron of greater than about 3-5 parts per 1,000 parts of solution. Therefore, the iron precipitation step 26 should reduce the concentration of iron to about less than 3 parts per 1,000 parts of solution. This is achieved by treating the solution with a monovalent ion selected from the class consisting of hydrogen (hydronimum), alkali metals, and ammonium. These ions may be obtained, for example, from ammonia and sodium sulfate etc. The ammonium ion is preferred. The resulting solution is then heated to a temperature in the range of 140°-200° C. and preferrably 160°-180° C. and if necessary, in an oxidizing atmosphere to assure that substantially all of the iron is in the ferric state to precipitate iron substantially as jarosite. The jarosites are crystalline precipitates which are easily filtered and washed.

When ammonium ion is employed, the compound $NH_4Fe_3(SO_4)_2(OH)_6$, ammonojarosite results according to the reaction represented by the equation:

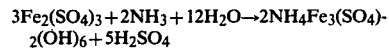

$$3Fe_2(SO_4)_3 + 2NH_3 + 12H_2O \rightarrow 2NH_4Fe_3(SO_4)_2(OH)_6 + 5H_2SO_4$$

About 1.47 parts of $H_2SO_4$ is formed per part of iron precipitated. Any ferrous ion present after the preceeding nitrate reduction step can be oxidized rapidly in this step at moderate pressures, that is, by using molecular oxygen or other oxidants and is precipitated as jarosite. In a case of ammonojarosite and oxygen, the reaction is in accordance with the equation:

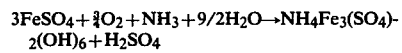

$$3FeSO_4 + \tfrac{3}{4}O_2 + NH_3 + 9/2H_2O \rightarrow NH_4Fe_3(SO_4)_2(OH)_6 + H_2SO_4$$

Suitable equipment for iron precipitation includes a cylindrical reactor of suitably corrosion-resistant (e.g., titanium) parts in contact with the slurry. For continuous operation, a series of cocurrent reactors can be employed or a single reactor compartmented to provide a series of agitated stages through which the slurry passes in cocurrent flow. In order to prevent the precipitate from dissolving to an appreciable extent it is necessary to separate solids from liquid at temperatures or to cool the slurry by heat exchange with cooling water or by flash evaporation of the slurry to a temperature of less than about 70° C. at which temperature conventional filtration (e.g., disc filters made with suitably corrosion-resistant metal parts) can be accomplished without appreciable re-solution of the iron. Thorough washing of the cake with cooled water is required to recover copper values and leave a residue suitable for discard.

After precipitation and removal of the iron, the resulting pregnant liquor is directed to conventional electrolytic cells 28 for metal recovery. Approximately 85-98% of the solution from the electrowinning circuit 28 (stream 30) is recycled to second leaching step 14. The remainder, usually about 2-15% by weight and preferably 5-10% by weight of the stream, is removed as a purge to control soluble impurities.

It should be noted at this point that the procedure for reducing the metal cations in the pregnant liquor to elemental metals forms no part of the instant invention and may be entirely conventional. Thus, various well-known techniques for reducing the metal ions to elemental metals and/or separating individual metal ions in a mixture from each other prior to reduction may be employed.

Material balances for the two stage leach of the present invention are shown in FIG. 2.

Experiments were conducted using a copper concentrate consisting of 20.9% copper, 27.4% iron, 30.2% sulfur, and 21.5% gangue. The leach liquor used was either a 100 g/l or 20 g/l $H_2SO_4$ aqueous solution. 100 g. of the foregoing concentrate was leached in 600 ml of leach liquor for 240 min. at 100° C. During the leach, gaseous nitrogen dioxide and oxygen were sparged into the slurry. The slurry was suspended and the gas dispersed by mixing with a four blade turbine impeller. During the first 100 minutes of leaching, about 90% of the copper values available were solubilized. In contrast, the weight of solubilized iron remained at a low level at the outset and rose steadily after about 70 minutes. The nitrate concentration remained substantially constant during the course of the leach and reached its zenith after most of the copper and iron values had been solubilized. This occurs at least in part because the residual concentrate does not provide enough surface area to react with all the $NO_2$ entering the reactor.

From the foregoing it should be clear that an essential feature of the present invention is to oxidize conventional slurries of sulfidic minerals with nitrogen dioxide to enable metal values contained therein to be rendered leachable in an aqueous leach liquor. Such slurries are produced in a conventional manner by particulating the sulfide ore to be leached to a size of −60 mesh or smaller and adding the particles to a sufficient amount of water to produce a slurry in first stage 12. Conventional slurries typically contain about 15% or less solids by weight. Once the slurry is produced, a gaseous mixture containing nitrogen dioxide and possibly oxygen is introduced into the slurry when it reaches the second stage 14. The amount of nitrogen dioxide utilized will vary depending on the stoichiometry of the reaction. It is desirable to have an amount of nitrogen dioxide that is slightly in excess of the stoichiometric amount needed to oxidize the sulfide ore being treated. The sparging rate of the gas is not critical and would vary according to the amount of slurry being treated and the residence time of the slurry in a reactor. Indeed, the entire nitrogen dioxide requirement of a particular batch of slurry being treated may be added to a closed reactor at one time. In this embodiment the reactants are agitated until the sulfide ore has been oxidized. The oxidized slurry would then be delivered from reactor 14 and a fresh batch of slurry would be introduced into reactor 14 from reactor 12.

It is preferred to maintain the reaction temperature at a value of less than 115° C. The preferred reaction temperature is between the range of 85° C. to 110° C. The temperature can be controlled by cooling the slurry in any conventional manner.

It is preferred to maintain the pressure during oxidation of the slurry at about atmospheric pressure. It is, however, possible to conduct the oxidation operation at pressures of 15 to 35 psi., absolute.

The materials treated in accordance with the present invention are sulfidic materials containing desired metal values. The materials may be in the form of ores or ores which have been concentrated. Thus, the material being treated may be either an ore or a concentrate in sulfidic form which contains recoverable metal values such as copper, silver, nickel, cobalt, molybdenum, zinc, iron, and mixtures thereof.

The invention may be embodied in other specific forms without departing from the spirit and essential characteristics thereof. The foregoing embodiments are therefore intended to be illustrative and not restrictive, the scope of the invention being indicated by the appended claims rather than by the foregoing description, and all changes which come within the meaning and range of equivalency of the claims are therefore intended to be embraced therein.

We claim:

1. A process for leaching copper values from a sulfidic mineral thereof comprising the steps of:
   A. providing a first stage containing an aqueous acidic leach liquor and adding a particulated sulfidic mineral containing copper values to said leach liquor in said first stage;
   B. delivering said particulated sulfidic mineral from said first stage to a second stage containing an aqueous acidic leach liquor to form a slurry in the second stage; and,
   C. adding a nitrogen dioxide containing gas into the slurry in said second stage the amount of nitrogen dioxide gas being at least the stoichiometric amount needed to oxidize the mineral particles and allowing the nitrogen dioxide to oxidize the mineral particles to enable the copper values to be solubilized in the leach liquor.

2. The process as set forth in claim 1 wherein nitric oxide is produced during the oxidation of said minerals in step C and said process comprises the further steps of:
   D. collecting nitric oxide as an off-gas;
   E. oxidizing the nitric oxide to nitrogen dioxide; and
   F. adding the nitrogen dioxide produced in step E to the slurry in the second stage.

3. The process as set forth in claim 2 wherein in step C, copper values are solubilized in the aqueous acidic leach liquor in the second stage to produce a pregnant metal bearing liquor and wherein the pregnant metal bearing liquor is delivered from the second stage to the first stage.

4. The process as set forth in claim 3 wherein the pregnant metal bearing liquor in the first stage is delivered to metal recovery and wherein the raffinate from the metal recovery is recycled to the second stage to provide the aqueous acidic leach liquor in the second stage.

5. The process as set forth in claim 4 wherein the particulated mineral in the first stage and the pregnant metal bearing leach liquor in the second stage are flowed in a countercurrent manner.

6. A process for leaching metal values selected from the group consisting of copper, silver, nickel, cobalt, molybdenum, zinc, iron, and mixtures thereof from a sulfidic mineral thereof comprising the steps of:
   A. providing a first stage containing an aqueous acidic leach liquor and adding a particulated sulfidic mineral containing metal values selected from the group consisting of copper, silver, nickel, cobalt, molybdenum, zinc, iron and mixtures thereof to said leach liquor in said first stage;
   B. delivering said particulated sulfidic mineral from said first stage to a second stage containing an aqueous acidic leach liquor to form a slurry in the second stage; and,
   C. adding a nitrogen dioxide containing gas into the slurry in the second stage the amount of nitrogen dioxide gas being at least the stoichiometric amount needed to oxidize the mineral particles and allowing the nitrogen dioxide to oxidize the mineral particles to enable values selected from the group consisting of copper, silver, nickel, cobalt, molybdenum, zinc, iron, and mixtures thereof to be solubilized in the leach liquor.

7. The process as set forth in claim 6 wherein nitric oxide is produced during the oxidation of said minerals in step C and said process comprises the further steps of:
   D. collecting nitric oxide as an off gas;
   E. oxidizing the nitric oxide to nitrogen dioxide; and,
   F. adding the nitrogen dioxide produced in step E to the slurry in the second stage.

8. The process as set forth in claim 7 wherein in step C values selected from the group consisting of copper, silver, nickel, cobalt, molybdenum, zinc, iron, and mixtures thereof are solubilized in the aqueous acidic leach liquor in the second stage to produce a pregnant metal bearing liquor and wherein the pregnant metal bearing liquor is delivered from the second stage to the first stage.

9. The process as set forth in claim 8 wherein the pregnant metal bearing liquor in the first stage is delivered to metal recovery and wherein the raffinate from the metal recovery is recycled to the second stage to provide an aqueous acidic leach liquor in the second stage.

10. The process as set forth in claim 9 wherein the particulated mineral in the first stage and the pregnant metal bearing liquor in the second stage are flowed in a countercurrent manner.

* * * * *